(12) United States Patent
Pantano et al.

(10) Patent No.: US 11,422,075 B2
(45) Date of Patent: Aug. 23, 2022

(54) DEVICE AND METHOD FOR DETERMINING MECHANICAL PROPERTIES OF NANOMATERIALS

(71) Applicant: UNIVERSITA' DEGLISTUDI DI TRENTO, Trento (IT)

(72) Inventors: Maria Pantano, Trento (IT); Nicola Pugno, Trento (IT); Giorgio Speranza, Madrano (IT)

(73) Assignee: UNIVERSITA' DEGLI STUDI DI TRENTO, Trento (IT)

( * ) Notice: Subject to any disclaimer, the term of this patent is extended or adjusted under 35 U.S.C. 154(b) by 0 days.

(21) Appl. No.: 16/649,723

(22) PCT Filed: Sep. 28, 2018

(86) PCT No.: PCT/IB2018/057539
§ 371 (c)(1),
(2) Date: Mar. 23, 2020

(87) PCT Pub. No.: WO2019/064249
PCT Pub. Date: Apr. 4, 2019

(65) Prior Publication Data
US 2020/0240887 A1    Jul. 30, 2020

(30) Foreign Application Priority Data
Sep. 28, 2017  (IT) .......................... 102017000108535

(51) Int. Cl.
*G01N 3/06*    (2006.01)
(52) U.S. Cl.
CPC ..... *G01N 3/068* (2013.01); *G01N 2203/0286* (2013.01); *G01N 2203/0647* (2013.01)

(58) Field of Classification Search
CPC .......... G01N 3/068; G01N 2203/0286; G01N 2203/0647; G01N 13/10; G01N 3/00; G01N 27/00; G01N 3/08
(Continued)

(56) References Cited

U.S. PATENT DOCUMENTS 5,786,621 A * 7/1998 Saif ...................... B81C 99/005
257/415
6,817,255 B2 * 11/2004 Haque ..................... H01L 22/34
73/626

(Continued)

FOREIGN PATENT DOCUMENTS

| CN | 101113946 B | 8/2010 |
|----|-------------|--------|
| CN | 104007028 A | 8/2014 |

OTHER PUBLICATIONS

International Search Report of the International Searching Authority, dated Nov. 30, 2018 for corresponding PCT patent application No. PCT/IB2018/057539.

*Primary Examiner* — Octavia Davis Hollington
(74) *Attorney, Agent, or Firm* — Abelman, Frayne & Schwab

(57) ABSTRACT

The invention relates to a device (10) for determining the mechanical properties of nanomaterials comprising a substrate (30) onto which a nanomaterial specimen (40) can be anchored, wherein said substrate (30) is mechanically connected to an actuator (20) on one side and to a sensor (50) on the opposite side, and wherein the substrate (30) is configured to generate a fracture line (32') in a predetermined position which divides the substrate (30) into two parts (31,31'), wherein a first part (31) is connected to the actuator (20) and a second part (31') is connected to a sensor (50), in order to allow a relative movement between the actuator (20) and the sensor (50).

8 Claims, 4 Drawing Sheets

(58) Field of Classification Search
USPC .......................................................... 73/799
See application file for complete search history.

(56) References Cited

U.S. PATENT DOCUMENTS

| | | | | |
|---|---|---|---|---|
| 8,499,645 | B2* | 8/2013 | Chasiotis | D01D 5/0007 73/789 |
| 9,019,512 | B2* | 4/2015 | Kang | G01N 3/02 356/614 |
| 9,279,753 | B2* | 3/2016 | Espinosa | G01N 3/08 |
| 2014/0331782 | A1* | 11/2014 | Keranen | H05B 3/32 73/856 |

* cited by examiner

DEVICE AND METHOD FOR DETERMINING MECHANICAL PROPERTIES OF NANOMATERIALS

CROSS REFERENCE TO RELATED APPLICATIONS

This application is a national phase of PCT application No. PCT/IB2018/057539, filed Sep. 28, 2018, which claims priority to IT patent application No. 102017000108535, filed Sep. 28, 2017, all of which are incorporated herein by reference thereto.

FIELD OF THE INVENTION

The present invention relates to a device and a method for determining the mechanical properties of nanomaterials.

In particular, the invention relates to an innovative setup for performing tensile tests on nanomaterials, such as microfibers, ultra-thin films, including monoatomic layers (e.g., graphene), and the like.

KNOWN PRIOR ART

As known, the discovery of graphene, material characterized by an inimitable combination of physical, optical, electric and mechanical properties [1], has spurred an increasing interest in the scientific community towards monoatomic materials, i.e., consisting of a single layer of atoms which are repeated periodically along two orthogonal directions, which are considered the essence of future technology today [2]. Indeed, graphene is only the first exponent of the numerous families of two-dimensional (2D) materials, which includes both polymers 2D [3-4] and inorganic monoatomic layers, such as transition metal dichalcogenides (e.g., MoS2, MoSe2, WS2, etc.) [5] or elementary materials (e.g., silicone, germanene, phosphorene, etc.) [6], some of which have been found to be excellent alternatives to graphene.

In order to better exploit the huge potential of these nanomaterials for the development of new high-performance which are also reliable, full knowledge of their mechanical behavior is needed.

However, despite a given number of theoretical and computational studies [7], the experimental data currently available are rather limited because of the difficulties related to manufacturing and handling. Indeed, the particular type of 2D materials makes it necessary to use much more sensitive and sophisticated devices than those which are usually employed in the case of macroscopic specimens.

Similar challenges have already been tackled in the '90s, when mechanical testing of the first films of micrometric thickness started [8-10] with the rapid expansion of electromechanical microsystems (MEMS). From that moment, a high number of specimens having size in the order of micro and nanometers have been tested with specifically designed experimental apparatuses, the most effective of which were based on the microsystem technology.

These are actual miniaturized testing systems, which include all the actuation and measuring structures needed to perform tensile tests of micro and nano specimens [11-22].

The main advantage offered by these devices is in their exclusive compatibility with scanning electron microscopes (SEM) or transmission electron microscopes (TEM), which provides the opportunity to observe the deformation of the specimens in real time during testing. However, although such devices were adopted to test a high variety of monodimensional nanostructures, such as nanofibers and nanotubes, or thin films (approximately 1 micrometer thick), rare are the studies which show their application to 2D materials [23], which on the other hand do not provide an exhaustive mechanical characterization thereof. Indeed, a nanomechanical device used to determine the fracture toughness of a graphene film, which for the purpose is provided with an initial notch, is found in literature [24].

Alternatively, a MEMS device, provided with an actuator and a capacitance load sensor, was used to apply traction to a graphene multi-layer to a 14% deformation, monitoring how the Raman signal shift varies as the deformation increases [23]. In this case, the breakage of the specimen was not achieved and other information on mechanical properties were not obtained.

In brief, the only experimental data available at this time on the mechanical properties of monoatomic materials, in terms of modulus of elasticity, strength and elongation at break, are still those obtained by nanoindentation with an atomic force microscope (AFM).

The first pioneering study performed by Lee et al. in 2008 [25] shows a single sheet of graphene deposited on a locally perforated substrate, which allows accessing a graphene membrane supported by the substrate only along the edge. This is then loaded in the center with the tip of the AFM, recording how the force applied varies according to the increase of the displacement of the membrane itself. The same setup was successively used in the case of polycrystalline graphene membranes [26] to assess the effect exerted by the edges of the grain on the mechanical properties of the graphene, and of graphene oxide [27], to study the mechanical-chemical transformations caused by the application of a deformation. In this case, the specimens are relatively small (membranes of the diameter of a few micrometers) and no information on the complete mechanical behavior was extrapolated.

The fracture toughness and the fracture propagation of the single sheets of graphene were obtained by means of bulge test [28]. In this case, extended graphene membranes (of 10-110 micrometers in diameter) were subjected to a bending load, by applying a difference of pressure between its opposite faces in quasi-static conditions. However, no data on the elastic or plastic properties were shown.

The load configuration adopted in the tests mentioned hereto is not the best when it is necessary to characterize the materials from the mechanical point of view, also as recently shown [29]. Indeed, by means of atomistic simulations, it has been found that the resistance obtained by means of nanoindentation with AFM varies even significantly from that obtained by means of a tensile test, which remains the most reliable way to obtain elastic and plastic properties of a material.

With reference to the patents found in literature, various are the patented devices used for the mechanical characterization of the materials on micro and nanoscale [P1-P9]. Some implement tensile tests but none involve a specimen initially deposited on a substrate.

Chinese patent CN101113946 describes a device for determining the properties of nanomaterials in which the sample to be tested is firstly positioned on the test machine inside a scanning electronic microscope SEM by means of a handler (i.e. by means of an arm which can move inside the chamber of the SEM), and then fixed in its final position by localized deposition of inert material, usually a precious metal, such as gold or platinum. The handling of an ultrathin film not supported by any structure (freestanding) is very difficult with the aforesaid handler and with other instruments currently available.

More recently, a device has been patented which allows performing tensile tests on nanofilms floating on a water film [P10].

It is an object of the present invention to overcome the mentioned drawbacks by making a device for determining the mechanical features of nanomaterials which allows a greater practicality of use, an improved reliability of the measurements and a particular cost-effectiveness of construction.

BRIEF DESCRIPTION OF THE INVENTION

These and other objects are achieved by a device for determining the mechanical properties of nanomaterials comprising a substrate on which a nanomaterial specimen can be anchored, wherein said substrate is mechanically connected to an actuator on one side and to a sensor on the opposite side, and wherein the substrate is configured to generate a fracture line thereof in a predetermined position to divide the substrate into two parts, of which a first part is connected to the actuator and a second part is connected to the sensor, in order to allow a relative movement between the actuator and the sensor.

One of the advantages of the invention is the fact that the position of the fracture line of the substrate can be predicted, circumstance which facilitate the correct positioning of the device for the purposes of observing the specimen under a microscope.

According to an embodiment of the invention, a rectangle of silicon is used as a substrate onto which the thin film to be characterized from a mechanical point of view is transferred. The silicon may be easily placed in water, in order to capture the film itself and may undergo high-temperature treatments without being damaged or modified. In particular, by using the geometry of the invention, which preferably includes the presence of one or more notches or recesses, the silicon substrate can be easily connected to the test machine—which can be macroscopic—and then separated into two parts, in order to ensure the possibility of relative movement at the two ends of the film, as required when performing tensile testing. The presence of the notched silicon substrate, which is essential in case of tests on ultra-thin films, also simplifies the preparation of larger size samples, such as microwires or films with a thickness equal to or greater than one micrometer. In this case, the sample of interest can be positioned on the silicon substrate by means of tweezers and fixed thereto by an adhesive.

According to another embodiment of the invention, the substrate on which the specimen is anchored has one or more recesses configured to generate a fraction line to divide the substrate into two parts.

In particular, since the substrate is weakened in that point, there is the certainty that the fracture will occur precisely at the recess once the incision is made.

According to another aspect of the invention, the device for determining the mechanical properties of nanomaterials has macroscopic dimensions which allow to test samples with characteristic dimensions of the order of micrometers or nanometers which extend over an area (over a length of the order of $mm^2$ (mm).

According to a further aspect of the invention, the sensor is configured to be deformed following the force impressed on it by the specimen when actuated by the actuator.

The particular configuration of the sensor allows the sensor to have an ideal rigidity (stiffness in technical parlance). Indeed, it undergoes displacements which are sufficiently large to be observed under an optical microscope following the application of a force of a few tenths of a Newton, which is typically the order of size of the forces involved on a microscale.

The invention further relates to a method for determining the mechanical properties of nanomaterials, wherein the method comprises the following steps:

anchoring a specimen to a substrate, wherein the substrate is mechanically connected to an actuator on one side and to a sensor on the opposite side, and wherein the substrate is configured to be fractured into two parts determining a fracture line;

activating an actuator so that said actuator produces a displacement of the part of substrate connected to it with respect to the part connected to the sensor and which translates in deformation of the specimen itself and widening of the substrate fracture;

taking under a microscope a plurality of successive images, by means of which to determine with accuracy the position of the two parts of the substrate, the one connected to the actuator and the one connected to the sensor, as well as the widening of the substrate fracture;

determining the mechanical properties of the material of which the specimen consists by means of computerized analysis of the aforesaid images and in particular of the force applied in the moment of fracturing of the specimen, determining the stress-strain curve and Young's modulus.

In particular, according to the invention, the displacement produced by the actuator is transmitted in part to the specimen, which is deformed, and is transmitted in part to the sensor, which is also deformed as a function of its rigidity. The sensor and the specimen thus behave like two springs placed behind one another.

Further features of the invention can be inferred from the dependent claims.

BRIEF DESCRIPTION OF THE FIGURES

Further features and advantages of the invention will be apparent from the reading of the following description provided by way of non-limiting example, with the aid of the figures shown on the accompanying tables, wherein.

DETAILED DESCRIPTION OF CERTAIN EMBODIMENTS OF THE PRESENT INVENTION

Figure 1:
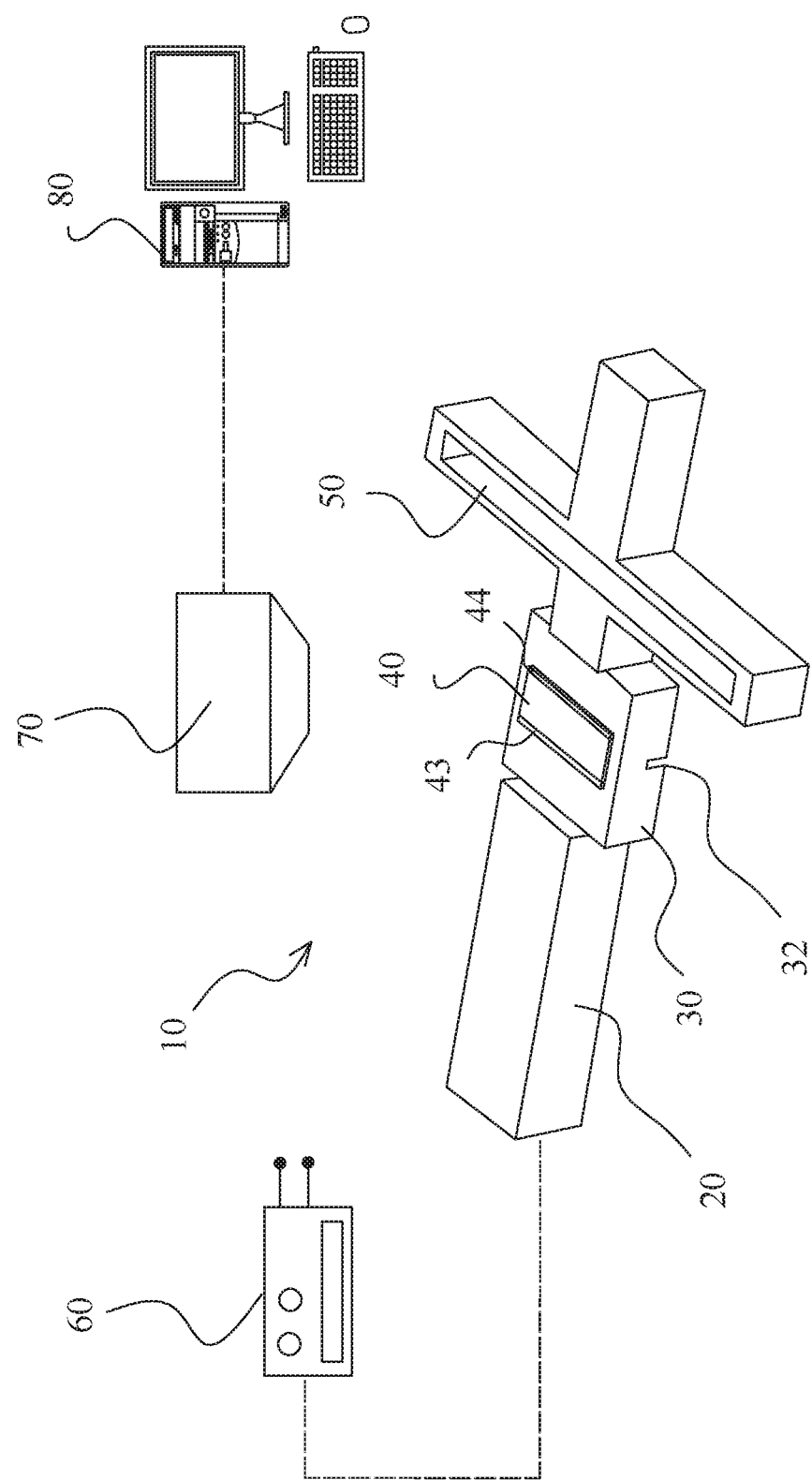
FIG. 1 shows a diagrammatic view of the device of the present invention.

The invention will now be described with reference to FIG. 1, which shows the innovative device capable of performing tensile tests on nanomaterials, such as microfibers, ultra-thin films, including monoatomic layers, such as graphene.

The device comprises an actuator 20 configured to apply a load to a specimen 40 of the nanomaterial to be tested and a sensor 50 for measuring the force applied to specimen 40.

Specimen 40 to be tested is placed on a substrate 30 and is appropriately anchored to such substrate 30.

In particular, specimen 40 is made to adhere well to substrate 30 only along two parallel edges 43, 44 which are orthogonal to the direction along which a uniaxial load will be applied during the test, while specimen 40 may slide on substrate 30 in the other regions.

Substrate 30 is provided with a recess 32 on its lower surface (or with two recesses, of which one is on the lower surface and one on the upper surface) and is glued to the force sensor 50 on one part and to actuator 20 on the other part.

In particular, sensor 50 may have a conformation provided with a groove 55 which is adapted to confer particular rigidity to the sensor itself so that it undergoes displacements sufficiently large to be observed under an optical microscope following the application of a force of a few tens of Newton.

After having glued substrate 30 with specimen 40 to sensor 50 and to actuator 20, substrate 30 is incised so as to break it into two parts 31, 31', according to the fracture line 32' (FIG. 3) so as to allow a relative moment between the parts 31, 31'.

After fracturing substrate 30, the test can start. Actuator 20 is activated so as to apply a displacement to the part 31 of substrate 30 glued to it, thus applying traction to specimen 40, which, in turn, deforms sensor 50 glued to it on the other part 31'.

The device 10 may be positioned under the lens of an optical microscope 70 so as to follow the deformation of specimen 40 itself in real time (and of sensor 50) during the test.

This allows recording a series of images, which can then be analyzed to obtain the displacement (e.g., strain) and the force (obtained by multiplying the displacement of the sensor by its elastic constant) applied to specimen 40 during the test. So, this allows constructing the stress-strain curve of the specimen itself, obtaining a complete mechanical characterization.

Again with reference to FIG. 1, actuator 20 can be supplied from the outside for correct operation of the device of the invention.

In the illustrated case, a power supply 60 provides the voltage needed to activate a heating circuit which increases the temperature in the environment around actuator 20, and the entire device 10 is positioned under the lens of an optical microscope 70, which frames specimen 40 at the fracture line in substrate 30 underneath. A computer 80 is connected to the camera of the optical microscope 70 and allows checking it and taking/storing the sequence of images during the experiment.

During the successive processing of the images taken during the test, it is possible to obtain the force (e.g., strain) and the corresponding displacement (e.g., deformation) undergone by specimen 40.

With regards to the preliminary step of preparing substrate 30 by incising, it is worth noting that said substrate 30 with specimen 40 is placed underneath a press 90 which allows holding it firmly in position.

Figure 3:
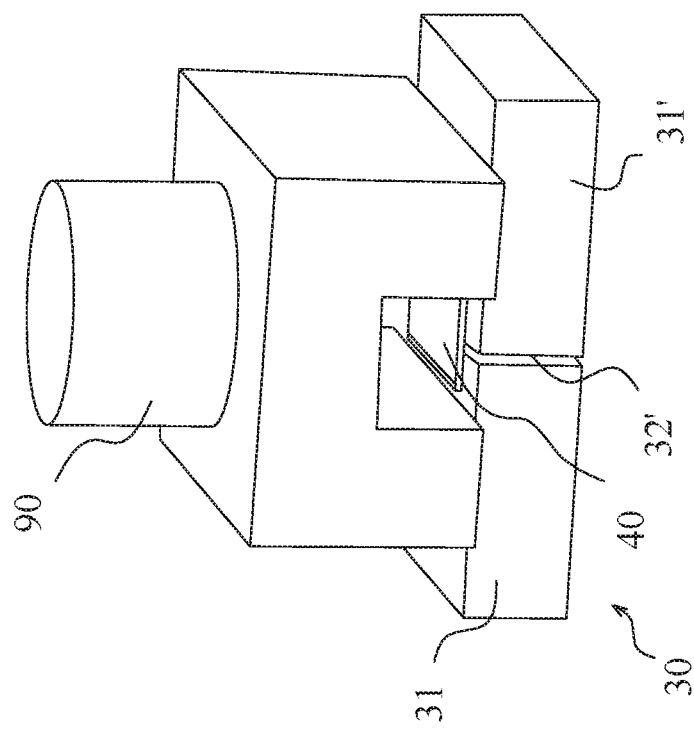
FIGS. 2 and 3 show the steps of preparing of the substrate of the device in FIG. 1.
Figure 2:
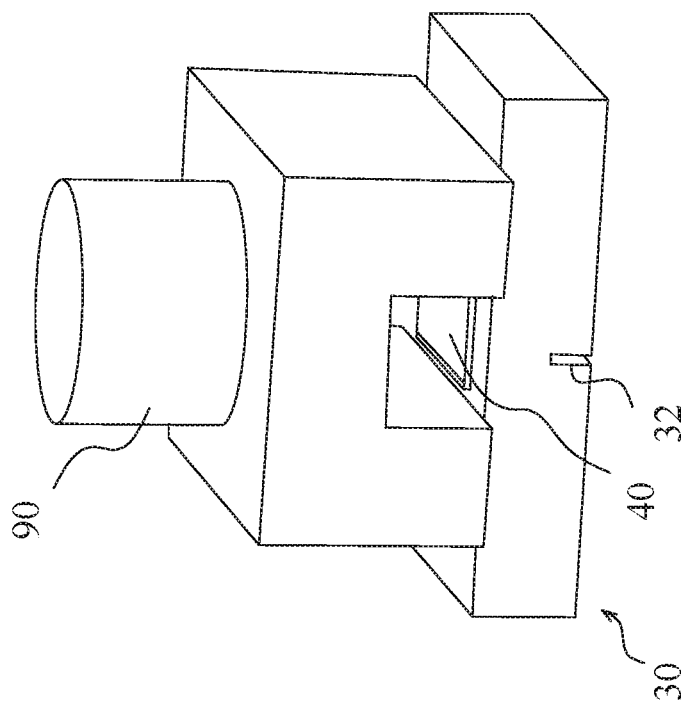

In this step, substrate 30 is already glued to actuator 20 and to sensor 50 (not shown in FIGS. 2 and 3 for the sake of simplicity).

By means of a sharp tip, which incises substrate 30 between the two legs of the press 90, substrate 30 is fractured and the press 90 is slowly removed.

In this manner, it can be ensured that there is a gap or through slot 32' of width also about or smaller than one micron between the two parts of substrate 30. Such width is much smaller that the dimension of the specimen in the direction in which the force will be applied, so that the specimen is not deformed.

The device 10 is then positioned under the lens of the optical microscope 70.

In a possible embodiment of the invention, actuator 20 includes a bar 22 made of PVC, surrounded by a copper screen, which during the test facilitates a homogeneous heating.

The heating occurs by approaching a series of incandescent light bulbs powered by the power supply 60 to actuator 20.

Actuator 20 and sensor 50 are glued to substrate 30, which in such embodiment consists of a block of silicon (Si), which is fractured into two parts, as described above.

Metallic clips may be included over the silicon block arranged for reasons of alignment. During the steps of preparing of the test, these are removed.

Figure 4:
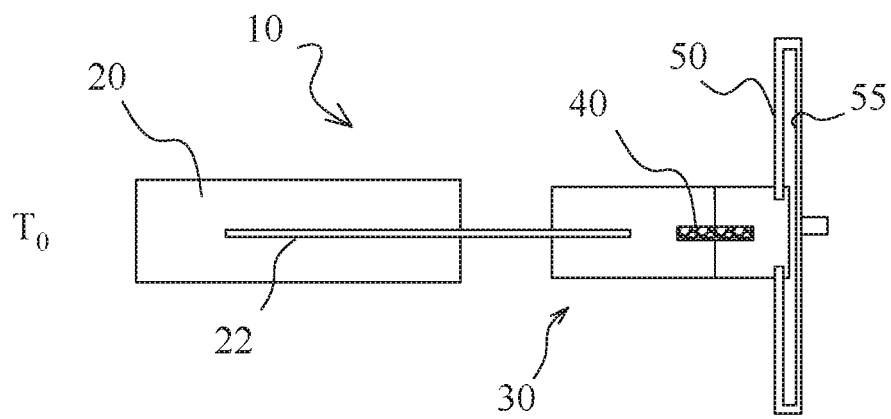
FIGS. 4-6 show operative steps of the device in FIG. 1 during a tensile test.
Figure 5:
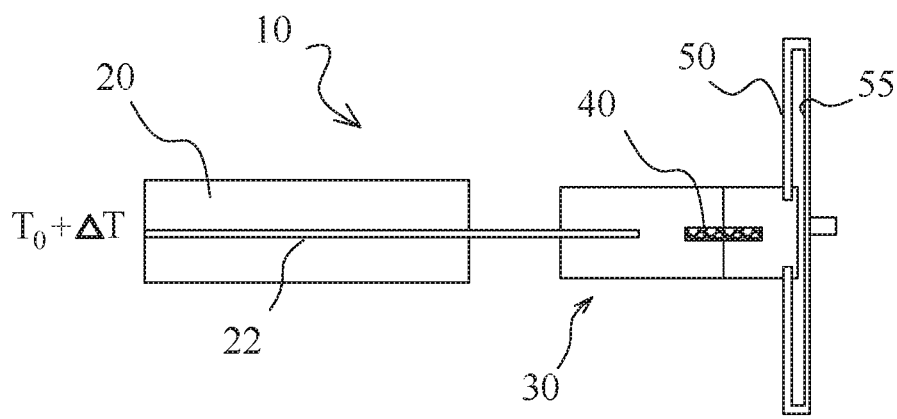
Figure 6:
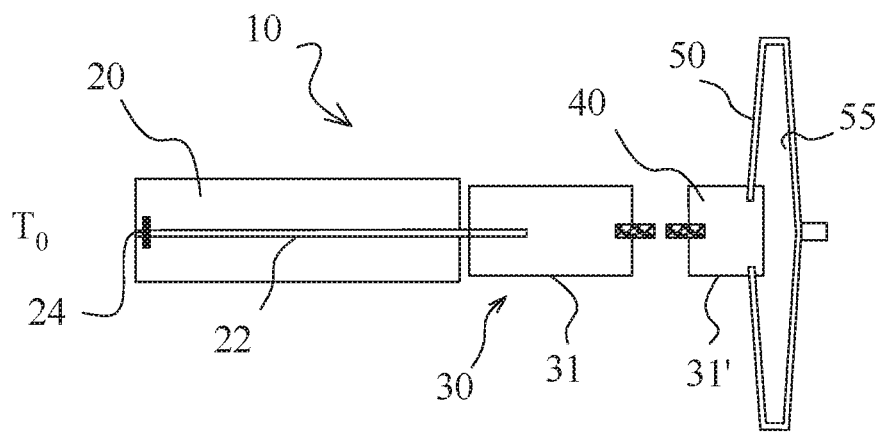
Figure 7:
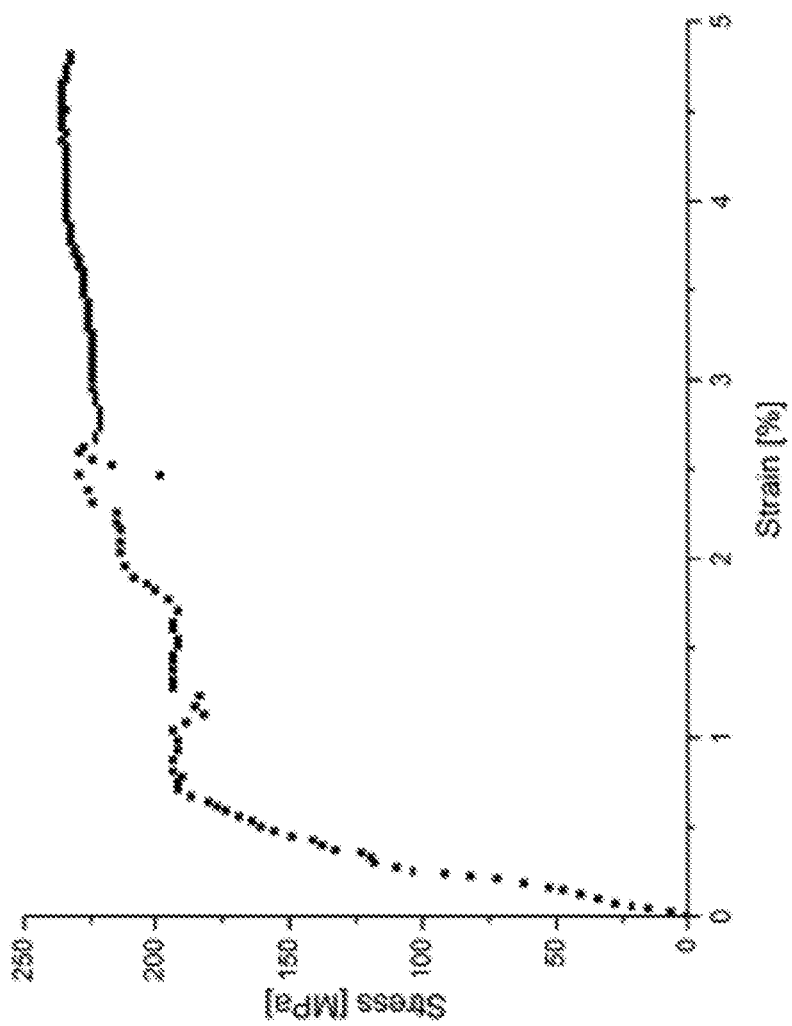
FIG. 7 shows a stress-strain curve of a microwire of aluminum (Al) having a diameter of 18 µm tested to breakage with the device of the invention.

FIGS. 4-6 illustrate operative steps of the device in FIG. 1 during a tensile test.

In a preferred embodiment, actuator 20 comprises a plastic bar 22 with a high thermal expansion coefficient (PVC).

When the bar 22 is heated, it is expanded and reaches the desired temperature, its end opposite to the one connected to the specimen is fixed (in 24—FIG. 6).

Afterwards, the heating circuit is switched off and consequently the actuator itself contracts. So, it starts pulling the block on which specimen 40 is glued towards itself, which block in turn pulls the end of substrate 30 connected to sensor 50. Having reached the final deformation, specimen 40 breaks and sensor 50 goes back to its resting configuration.

Again in the operation of the device of the invention, a series of photographs which frame the gap 32' between the two blocks of silicon, are taken during the test of specimen 40. Such gap 32' tends to be gradually modified as the specimen is deformed with the side of the part of sensor 50 moving away from the side of actuator 20.

By comparing the position of the side-sensor/actuator in different instants (e.g., photographs), by means of a correlation algorithm of images implemented on the computer, the absolute value of the mutual displacement of actuator 20 and sensor 50 can be understood.

Once the displacement of the sensor is known, this is multiplied by the elastic constant which characterizes the sensor itself (obtained from preceding calibration), thus providing the value of the corresponding force, which is equal to that undergone by specimen 40, being sensor and actuator arranged as springs in series. The strain can be obtained by dividing such force by the transversal area of specimen 40.

The displacement impressed to specimen 40 is obtained instead by subtracting the displacement of sensor 50 from the displacement of actuator 20, instead.

The deformation can be determined by dividing such displacement by the initial length.

With regards to the positioning of specimen 40 on substrate 30, according to the specimen to be tested, it may be arranged on substrate 30 so that it is arranged straddling the lower recess 32 of substrate 30, by means of a pair of tweezers or with a handler and once in position its ends can be anchored to the substrate by means of glue or by depositing other fixing material.

Alternatively, specimen 40 may consist of a specimen which is made to grow directly on substrate 30, which will then be fractured before the test.

In this case, it is useful to have a substrate 30 with upper and lower cut, so as to have a specimen sample completely free from the substrate (the one corresponding to the upper cut).

In general, other types of actuator and sensor may be used. It is important for the actuator to produce sufficiently large displacements to break the concerned specimen and for the sensor to measure the forces involved.

Obviously, changes and improvements dictated by contingent or particular reasons may be made to the invention as described without because of this departing from the scope of the invention, as claimed below.

REFERENCES

1. A. K. Geim, K. S. Novoselov, The rise of graphene, Nature Materials 2007, 6: 183-191.
2. A. Ferrari et al., Science and technology roadmap for graphene, related two-dimensional crystals, and hybrid systems, Nanoscale 2015, 7: 4598-4810.
3. P. Kissel, D. J. Murray, W. J. Wulftange, V. J. Catalano, B. T. King, A nanoporous two-dimensional polymer by single-crystal-to-single-crystal photopolymerization, Nature Chemistry 2014, 6: 774-778.
4. M. J. Kory, M. Wörle, T. Weber, P. Payamyar, S. W. van de Poll, J. Dshemuchadse, N. Trapp, A. D. Schlüter, Gram-scale synthesis of two-dimensional polymer crystals and their structure analysis by X-ray diffraction, Nature Chemistry 2014, 6: 779-784.
5. Q. H. Wang, K. Kalantar-Zadeh, A. Kis, J. N. Coleman, M. S. Strano, Electronics and optoelectronics of two-dimensional transition metal dichalcogenides, Nature Nanotechnology 2012, 7: 699-712.
6. Z. Ni, Q. Liu, K. Tang, J. Zheng, J. Zhou, R. Qin, Z. Gao, D. Yu, J. Lu, Tunable Bandgap in Silicene and Germanene, Nano Letters 2011, 12: 113-118.
7. O. V. Yazyev, Y. P. Chen, Polycrystalline graphene and other two-dimensional materials, Nature Nanotechnology 2014, 9:755-767.
8. D. T. Read, J. W. Dally, A new method for measuring the strength and ductility of thin films, Journal of Materials Research 1993, 8 (7): 1542-1549.
9. W. N. Sharpe, Jr., Bin Yuan, and R. L. Edwards, A New Technique for Measuring the Mechanical Properties of Thin Films, Journal of Microelectromechanical Systems 1997, 6 (3): 193-199.
10. M. T. A Saif, N. C. MacDonald, A millinewton microloading device, Sensors and Actuators A 1996, 52: 65-75.
11. Y. Zhu, H. D. Espinosa, An electromechanical material testing system for in situ electron microscopy and applications, Proceedings of the National Academy of Sciences of the United States of America 2005, 102 (41): 14503-14508.
12. M. A. Hague, M. T. A. Saif, In situ tensile testing of nano-scale specimens in SEM and TEM, Experimental Mechanics 2002, 42 (1): 123-128.
13. H. Kahn, R. Ballarini, R. L. Mullen, A. H. Heuer, Electrostatically actuated failure of microfabricated polysilicon fracture mechanics specimens, Proceedings of the Royal Society a-Mathematical Physical and Engineering Sciences 1999, 455: 3807-3823.
14. C. L. Muhlstein, S. B. Brown, R. O. Ritchie, High-cycle fatigue and durability of polycrystalline silicon thin films in ambient air, Sensors and Actuators A 2001, 94: 177-188.
15. S. J. Eppell, B. N. Smith, H. Kahn, R. Ballarini, Nano measurements with micro-devices: mechanical properties of hydrated collagen fibrils, Journal of the Royal Society Interface 2006, 3, 117-121.
16. D. Zhang, J. M. Breguet, R. Clavel, V. Sivakov, S. Christiansen, J. Michler, In situ Electron Microscopy Mechanical Testing of Silicon Nanowires Using Electrostatically Actuated Tensile Stages, Journal of Microelectromechanical Systems 2010, 9 (3): 663-74.
17. J. J. Brown, J. W. Suk, G. Singh, A. I. Baca, D. A. Dikin, R. S. Ruoff, Bright VM. Microsystem for nanofiber electromechanical measurements, Sensors and Actuators A 2009, 155: 1-7.
18. S. Gravier, M. Coulombier, A. Safi, N. André, A. Boé, J.-P. Raskin, T. Pardoen, New On-Chip Nanomechanical Testing Laboratory—Applications to Aluminum and Polysilicon Thin Films, Journal of Microelectromechanical Systems 2009, 18 (3): 555-569.
19. M. Naraghi, I. Chasiotis, Optimization of Comb-Driven Devices for Mechanical Testing of Polymeric Nanofibers Subjected to Large Deformations, Journal of Microelectromechanical Systems 2009, 18 (5): 1032-1046.
20. K. Abbas, S. Alaie, Z. C. Leseman, Design and characterization of a low temperature gradient and large displacement thermal actuators for in situ mechanical testing of nanoscale materials, Journal of Micromechanics and Microengineering 2012, 22: 125027.
21. M. F. Pantano, N. M. Pugno, Design of a bent beam electrothermal actuator for in situ tensile testing of ceramic nanostructures, Journal of the European Ceramic Society 2014, 34: 2767-2773.
22. M. F. Pantano, R. A. Bernal, L. Pagnotta, H. D. Espinosa, Multiphysics design and implementation of a microsystem for displacement-controlled tensile testing of nanomaterials, Meccanica 2015, 50: 549-560.
23. P. Zhang, L. Ma, F. Fan, Z. Zeng, C. Peng, P. E. Loya, Z. Liu, Y. Gong, J. Zhang, X. Zhang, P. M. Ajayan, T. Zhu, J. Lou, Fracture toughness of graphene, Nature Communications 2014,15: 3782.
24. H. H. Pérez Garza, E. W. Kievit, G. F. Schneider, U. Staufer, Controlled, Reversible, and Nondestructive Generation of Uniaxial Extreme Strains (>10%) in Graphene, Nano Letters 2014, 14 (7): 4107-4113.
25. C. Lee, X. Wei, J. W. Kysar, J. Hone, Measurement of the Elastic Properties and Intrinsic Strength of Monolayer Graphene, Science 2008, 321: 385-388.
26. G.-H. Lee, R. C. Cooper, S. J. An, S Lee, A. van der Zande, N. Petrone, A. G. Hammerberg, C. Lee, B. Crawford, W. Oliver, J. W. Kysar, J Hone, High-strength chemical-vapor-deposited graphene and grain boundaries, Science 2013, 340: 1073-1076.
27. X. Wei, L. Mao, R. A. Soler-Crespo, J. T. Paci, J. Huang, S. T. Nguyen, H. D. Espinosa, Plasticity and ductility in graphene oxide through a mechanochemically induced damage tolerance mechanism, Nature Communications 2015, 6: 8029.
28. Y. Hwangbo, C.-K. Lee, S.-M. Kim, J.-H. Kim, K.-S. Kim, B. Jang, H.-J. Lee, S.-S. Kim, J.-H. Ahn, S.-M. Lee, Fracture characteristics of monolayer CVD-graphene, Scientific Reports 2014, 4: 4439.
29. J. Han, N. M. Pugno, S. Ryu, Nanoindentation cannot accurately predict the tensile strength of graphene or other 2D materials, Nanoscale 2015, 7: 15672.
P1. de Boer M, Bitsie F, Jensen B D. Electrostatic apparatus for measurement of microfracture strength. U.S. Pat. No. 6,424,165 B1 2002.

P2. Sinclair M B, DeBoer M P, Smith N F, Jensen B D, Miller S J. Method and system for automated on-chip material and structural certification of MEMS devices. U.S. Pat. No. 6,567,715 B1 2003.

P3. Mackin T J, Leseman Z C. System and method for mechanical testing of freestanding microscale to nanoscale thin film. US20060186874 A1 2006.

P4. Suhir E, Xu Y, Zhang Y. Method and apparatus for evaluation and improvement of mechanical and thermal properties of CNT/CNF arrays. US20080096293 A1 2008.

P5. Saif M T A, MacDonald N C. Microelectromechanical integrated microloading device. U.S. Pat. No. 5,786,621 1998.

P6. Sato K, Shikida M. Material testing device, material testing apparatus and material testing method. U.S. Pat. No. 5,869,768 1999.

P7. Hague A, Saif M T A. Apparatus and method for testing of microscale to nanoscale thin films. U.S. Pat. No. 6,817,255 B2 2004.

P8. Lou J, Ganesan Y, Lu Y, Peng C. Micromechanical devices for materials characterization. US20100108884 A1 2010.

P9. Espinosa H D, Bernal R A. Microelectromechanical device and system. US20120297897 A1 2012.

P10. Hwang B, Hyun S, Kim J, Woo C, Lee H, Jeong J, Kim T. Apparatus and method for measuring mechanical properties of freestanding nano thin film. WO2014081109 2014.

The invention claimed is:

1. A device for determining the mechanical properties of nanomaterials, said device comprising:
a substrate on which a nanomaterial specimen can be anchored, said substrate comprising opposing first and second parts connected to each other along a predetermined fracture line, said first part mechanically connected to an actuator said second part mechanically connected to a sensor, said first and second parts separable along the predetermined fracture line to allow a relative movement between the actuator and the sensor.

2. A device according to claim 1, wherein the specimen is anchored to the substrate along its two parallel edges which are orthogonal with respect to the direction in which a uniaxial load generated by the actuator during the test is applied, while the specimen may slide on the substrate in the other regions.

3. A device according to claim 1, wherein the substrate has a top side and a bottom side, each provided with one or more notches, said one or more notches of the bottom side configured to generate the predetermined fracture line, said one or more notches of the top side configured to keep the specimen completely suspended and free with respect to the substrate.

4. A device according to claim 3, wherein the aforesaid device is positioned under the lens of an optical microscope which frames the specimen at the predetermined fracture line of the substrate underneath the specimen.

5. A device according to claim 4, wherein a computer is connected to the optical microscope to allow a complete control of a camera to take a sequence of photographs of the specimen, and to store and process the photographs.

6. A device according to claim 1, wherein the actuator comprises a bar made of a material having a high thermal expansion coefficient, said bar being connected to a heating system actuated by means of a power supply which causes a homogeneous heating thereof.

7. A device according to claim 1, wherein the sensor is configured to be deformed following the force impressed on it by the specimen when it is actuated by the actuator.

8. A method for determining the mechanical properties of nanomaterials, wherein the method comprises the following steps:
anchoring a specimen to a substrate, said substrate comprising opposing first and second parts connected to each other along a predetermined fracture line, said first part mechanically connected to an actuator said second part mechanically connected to a sensor, said first and second parts separable along the predetermined fracture line;
activating the actuator so that said actuator produces a displacement of the first part with respect to the second part which translates into deformation of the specimen itself and widening of a gap between the first and second parts;
taking, by means of microscope, a plurality of successive images of the specimen by means of which to determine with accuracy a position of the first and second parts of the substrate, as well as the widening of the gap between the first and second parts;
determining the mechanical properties of the material of which the specimen is made by means of computerized analysis of the aforesaid images.

* * * * *